US010497080B2

(12) United States Patent
Ma

(10) Patent No.: US 10,497,080 B2
(45) Date of Patent: Dec. 3, 2019

(54) METHOD AND APPARATUS FOR IMAGE PROCESSING

(71) Applicant: ZHUHAI SEINE TECHNOLOGY CO., LTD., Zhuhai (CN)

(72) Inventor: Yangxiao Ma, Zhuhai (CN)

(73) Assignee: ZHUHAI SEINE TECHNOLOGY CO., LTD., Zhuhai (CN)

( * ) Notice: Subject to any disclaimer, the term of this patent is extended or adjusted under 35 U.S.C. 154(b) by 33 days.

(21) Appl. No.: 15/936,046

(22) Filed: Mar. 26, 2018

(65) Prior Publication Data

US 2018/0225798 A1   Aug. 9, 2018

Related U.S. Application Data

(63) Continuation of application No. PCT/CN2016/098531, filed on Sep. 9, 2016.

(30) Foreign Application Priority Data

Sep. 28, 2015  (CN) .......................... 2015 1 0631594

(51) Int. Cl.
- *H04N 5/225* (2006.01)
- *G06T 1/00* (2006.01)
- *H04N 5/232* (2006.01)

(52) U.S. Cl.
CPC ....... *G06T 1/0007* (2013.01); *H04N 5/23229* (2013.01); *G06T 2207/10* (2013.01)

(58) Field of Classification Search
None
See application file for complete search history.

(56) References Cited

U.S. PATENT DOCUMENTS

| 6,044,179 | A | 3/2000 | Savakis |
| 9,418,316 | B1 * | 8/2016 | Liu ...................... G06K 9/3258 |
| 2004/0042680 | A1 | 3/2004 | Saund |
| 2008/0079962 | A1 | 4/2008 | Torikoshi |

(Continued)

FOREIGN PATENT DOCUMENTS

| CN | 101840693 A | 9/2010 |
| CN | 102523364 A | 6/2012 |

(Continued)

OTHER PUBLICATIONS

The World Intellectual Property Organization (WIPO) International Search Report for PCT/CN2016/098531 dated Oct. 26, 2016 7 Pages.

*Primary Examiner* — Twyler L Haskins
*Assistant Examiner* — Dwight Alex C Tejano
(74) *Attorney, Agent, or Firm* — Anova Law Group PLLC

(57) ABSTRACT

An image processing method is provided. The method includes acquiring image data; obtaining a page pixel average value of the image data; acquiring image processing parameters based on the page pixel average value; obtaining a pixel processing threshold by a calculation based on at least a first portion of the image processing parameters; based on the pixel processing threshold, adjusting a pixel value of a current pixel of the image data by using at least a second portion of the image processing parameters; and outputting an adjusted image according to the adjusted pixel value of the current pixel of the image data.

10 Claims, 5 Drawing Sheets

(56) References Cited

U.S. PATENT DOCUMENTS

| | | | | |
|---|---|---|---|---|
| 2010/0156919 A1* | 6/2010 | Bala | .................. | G06T 11/60 |
| | | | | 345/582 |
| 2010/0202026 A1* | 8/2010 | Chiu | .................. | H04N 1/107 |
| | | | | 358/488 |
| 2011/0267490 A1* | 11/2011 | Goktekin | .......... | G06K 9/00463 |
| | | | | 348/222.1 |
| 2011/0285874 A1* | 11/2011 | Showering | ............ | G06K 9/033 |
| | | | | 348/231.99 |
| 2012/0113489 A1* | 5/2012 | Heit | .................. | G06K 9/186 |
| | | | | 358/518 |
| 2012/0294528 A1* | 11/2012 | Li | .................. | H04N 1/387 |
| | | | | 382/173 |
| 2013/0155474 A1* | 6/2013 | Roach | ................. | G06Q 20/322 |
| | | | | 358/505 |
| 2013/0271796 A1 | 10/2013 | Landa | | |
| 2014/0118560 A1* | 5/2014 | Bala | .................. | H04N 5/225 |
| | | | | 348/207.1 |
| 2014/0268247 A1* | 9/2014 | Sakaida | ................ | H04N 1/387 |
| | | | | 358/406 |
| 2015/0049948 A1* | 2/2015 | Bala | .................. | G06K 9/18 |
| | | | | 382/182 |
| 2015/0063720 A1* | 3/2015 | Maltz | .................... | G06T 5/007 |
| | | | | 382/284 |

FOREIGN PATENT DOCUMENTS

| | | |
|---|---|---|
| CN | 102782706 A | 11/2012 |
| CN | 104657969 A | 5/2015 |
| CN | 105245756 A | 1/2016 |

\* cited by examiner

METHOD AND APPARATUS FOR IMAGE PROCESSING

CROSS-REFERENCES TO RELATED APPLICATIONS

This application is a continuation application of PCT Patent Application No. PCT/CN2016/098531, filed on Sep. 9, 2016, which claims the priority of Chinese Patent Application No. 201510631594.0, entitled "Method and Apparatus for Image Processing", filed on Sep. 28, 2015, the content of all of which is incorporated by reference in its entirety.

TECHNICAL FIELD

The present disclosure generally relates to the field of image processing technologies and, more particularly, relates to method and apparatus for image processing.

BACKGROUND

Nowadays, various output pieces of electronic devices such as mobile phones, computers, etc., are used more and more in occasions other than the electronic devices. This requires high quality of the output pieces. Generally, an output piece of an electronic device may refer to an electronic picture shot by the electronic device or an electronic, scanned copy, a photocopied copy, a facsimile copy, etc., of original documents of paper documents, photos, certificates, cards, etc.

The electronic pictures are usually shot by various kinds of cameras, such as camera head of a camera, a smart phone, and a computer, and are widely used in electronic device. The electronic pictures are also used for diagnosis or research in the field of medical science, as shown in FIG. 1A. The electronic scanned copy is obtained by scanning an original document. The copy is obtained by scanning the original document and then printing out the electronic image obtained by scanning. The facsimile copy is obtained by scanning the original document, sending the electronic image obtained by scanning to a facsimile machine of a recipient, and printing the received electronic image by the recipient.

Due to the various factors mentioned above, the background data or the foreground data, which is included in the electronic picture shot by the electronic device or the electronic image obtained by scanning through a scanner, often does not meet the expectation of the user. Thus, certain defects may exist in the electronic picture or the electronic image, and the quality of the output piece may be affected.

Therefore, there is an urgent need in the image processing technology to correct the defects that exist in the electronic picture or the electronic image obtained by scanning, and to improve the quality of the output piece.

The disclosed devices and methods are directed to at least partially alleviate one or more problems set forth above and to solve other problems in the art.

SUMMARY

One aspect of the present disclosure provides an image processing method. The image processing method includes acquiring image data; obtaining a page pixel average value of the image data; acquiring image processing parameters based on the page pixel average value; obtaining a pixel processing threshold by a calculation based on at least a first portion of the image processing parameters; based on the pixel processing threshold, adjusting a pixel value of a current pixel of the image data by using at least a second portion of the image processing parameters; and outputting an adjusted image according to the adjusted pixel value of the current pixel of the image data.

Another aspect of the present disclosure provides an image processing apparatus. The image processing apparatus includes: an image acquisition device; a parameter acquisition device; a calculator; and a pixel processor. The image acquisition device is configured to acquire image data. The parameter acquisition device is configured to acquire image processing parameters based on a page pixel average value. The calculator is configured to obtain the page pixel average value of the image data and obtain a pixel processing threshold by a calculation based on at least a first portion of the image processing parameters. The pixel processor is configured to, based on the pixel processing threshold, adjust a pixel value of a current pixel of the image data by using at least a second portion of the image processing parameters and output an adjusted image according to the adjusted pixel value of the current pixel of the image data.

Other aspects or embodiments of the present disclosure can be understood by those skilled in the art in light of the description, the claims, and the drawings of the present disclosure.

BRIEF DESCRIPTION OF THE DRAWINGS

The accompany drawings are provided to further understand the technical solutions of the present disclosure or the prior art, and are a part of the specification. The drawings are merely examples for illustrative purposes according to various disclosed embodiments and are not intended to limit the scope of the present disclosure.

DETAILED DESCRIPTION

Figure 1A:
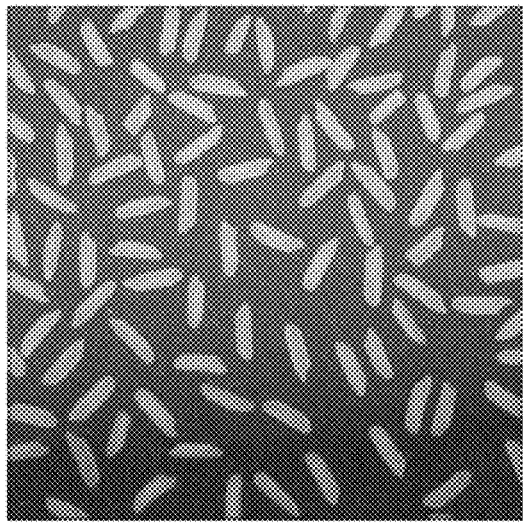
FIG. 1A is a schematic diagram of an electronic picture with background content.

The embodiments of the present invention will be described in detail with reference to the accompanying drawings and the exemplary embodiments. How to solve the technical problems by applying the corresponding technical means, and how to implement the process to realize the corresponding technical effect can be fully understood and implemented accordingly. The embodiments of the present disclosure and the features in the embodiments of the present disclosure can be combined with each other on the premise of no conflict, and the formed technical scheme is within the protection scope of the invention.

In addition, the method disclosed by the embodiments of the disclosure, as shown in the accompanying drawings, can be executed in a computer system, such as a computer which can execute a set of computer-executable instructions for performing the disclosed method, e. g., by a hardware processor. The computer-executable instructions may be stored on a memory. The memory may be coupled with the hardware processor.

Moreover, although the method disclosed by the embodiments of the disclosure embodies a logical sequence to execute the technical scheme illustrated in the flow chart. However, the logic sequence of the technical solutions of the present disclosure can also be implemented in a manner different from that shown in the drawings.

Figure 1B:
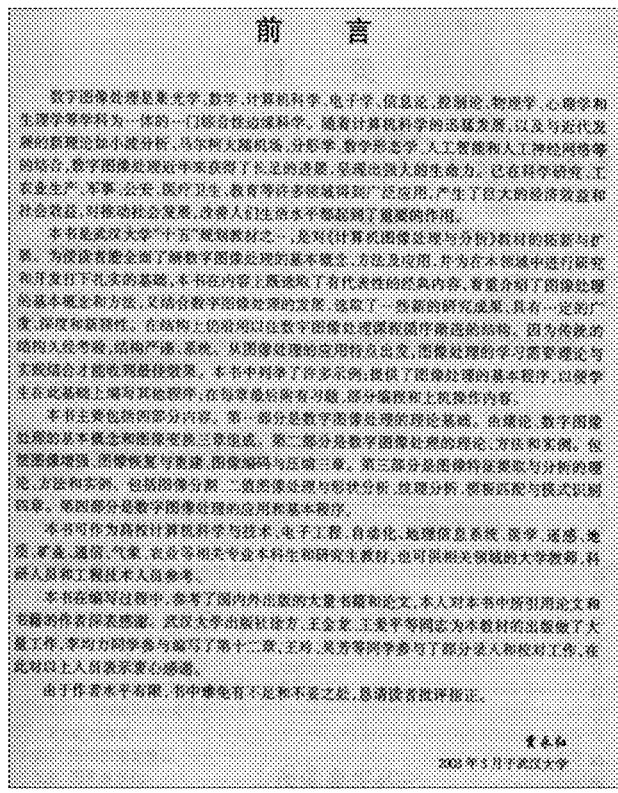
FIG. 1B is a schematic diagram of an electronic image with background content corresponding to the original copy.

In the electronic picture, there is always some "background data", including content that the user does not want it to appear, such as a dark-colored background with a large surface in FIG. 1A. In the process of scanning an original copy, the original copy always has a lot of background content, and the content, which the user does not need, may exist in the original copy. The background content, such as a newspaper or a magazine page with a dark-colored background, an original copy of paper turning colored due to long storage time, as shown in FIG. 1B, or a distorted scanned image due to the scanner itself (for example, the scanner is deformed), etc., may show content that the user does not want it to appear in the output piece. Such content is called the background data.

On the other hand, in the process of shooting an electronic picture or scanning the original copy, the intensity of the ambient light, the time of exposure, the light exposure, etc., may affect the image information quality of "foreground data" of the obtained electronic picture or the electronic image obtained by scanning. The brightness, the degree of colorfulness, etc., of the electronic picture or the electronic image is often difficult to meet the expectation of the user. The term "foreground data" refers to image information which the user wants to obtain or store.

Figure 2:
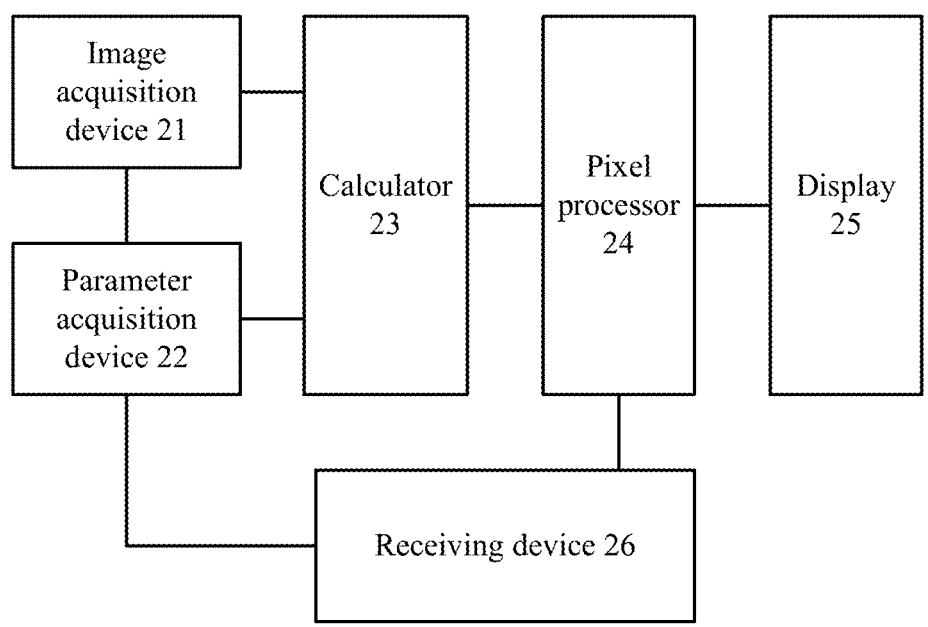
FIG. 2 is a schematic structural diagram of an image processing apparatus according to some embodiments of the present disclosure.

FIG. 2 shows a structural diagram of an image processing apparatus according to some embodiments of the present disclosure. As shown in FIG. 2, an exemplary image processing apparatus includes an image acquisition device 21, a parameter acquisition device 22, a calculator 23, and/or a pixel processor 24. As disclosed, more devices may be added in FIG. 2 and existing devices in FIG. 2 may be omitted or modified.

The image acquisition device 21 is used for acquiring the image data.

An imaging forming device may include, but not limited to, a scanner, a copying machine, a fax machine, a multi-functional image forming device with a scanning function, etc., and the imaging forming device will be referred to as an imaging device herein. When the imaging device having a scanning function receives a scanning command, the scanner of the imaging device scans the original document on the draft table, and an electronic image of the original document is generated. The scanning command may be alternatively a copying command, a facsimile command, or other commands from the user as long as the imaging device has a scanning action after receiving the commands. In other embodiments of the present disclosure, the image data can be acquired by photographing the electronic picture through the camera of the electronic device, or acquired from an existing electronic picture in the electronic device such as a mobile phone, a computer, etc.

The parameter acquisition device 22 is connected with the image acquisition device 21, and based on a page pixel average value, the image processing parameters are acquired by searching a preset parameter table. For the page pixel average value, please refer to the below detailed description.

In some embodiments of the present disclosure, the preset parameter table defines a mapping relationship between the page pixel average value and a plurality of the image processing parameters. The image processing parameters are used for calculating a pixel processing threshold and adjusting the pixel value of the image data. The image processing parameters at least include a magnification m of the page pixel average value and an offset n of the page pixel average value, adjusting parameters $p_1$, $q_1$, of the foreground output pixel and adjusting parameters $p_2$, $q_2$ of the background output pixel.

After the image acquisition device 21 acquires the image data, the calculator 23 calculates the page pixel average value a of the image data corresponding to the current page. If the image data is a multi-page data, each page of data is calculated, respectively. The numerical range of a is [0, 255]. When a=0, the page data is for a pure black image, and when a=255, the page data is for a pure white image. The parameter acquisition device 22 searches in a preset parameter table based on the page pixel average value a to acquire the magnification m of the page pixel average value, the offset n of the page pixel average value, the adjusting parameters $p_1$, $q_1$ of the foreground output pixels, and the adjusting parameters $p_2$, $q_2$ of the background output pixel.

Table 1 is an example of a preset parameter table. The present disclosure is not limited by this table. Any suitable preset parameter table may be used and encompassed within the scope of the present disclosure.

TABLE 1

| a | m | n | $p_1$ | $q_1$ | $p_2$ | $q_2$ |
|---|---|---|---|---|---|---|
| 0 | (0, +∞) | (−∞, +∞) | (−∞, +∞) | (−∞, +∞) | (−∞, +∞) | (−∞, +∞) |
| ... | ... | ... | ... | ... | ... | ... |
| 195 | 0.04 | −10 | 1 | 0 | 0 | 255 |
| ... | ... | ... | ... | ... | ... | ... |
| 255 | (0, +∞) | (−∞, +∞) | (−∞, +∞) | (−∞, +∞) | (−∞, +∞) | (−∞, +∞) |

The number m can be any random number in a positive range, and the number n can be any random number. The optimal values of m and n correspond to each page pixel average value a are measured through experiments. $p_1$, $q_1$, $p_2$, and $q_2$ can be any random number, and the optimal values for the parameters correspond to each page pixel average value a are mainly determined by the demand degree of descending of the background and/or of the adjustment of the foreground.

For a certain page pixel average value a, the current page data may have a plurality of pixel processing degrees, so that m and n can be combinations of a plurality of different values. Table 2 shows the exemplary values for m and n when the page pixel average value is 195. The present disclosure is not limited by this table. Any suitable preset parameter table may be used and encompassed within the scope of the present disclosure.

TABLE 2

| a | Pixel processing degree | m | n | $p_1$ | $q_1$ | $p_2$ | $q_2$ |
|---|---|---|---|---|---|---|---|
| 195 | Slight processing | 0.06 | 10 | 1 | 0 | 0 | 255 |
| | ... | | | | | | |
| | Moderate processing | 0.045 | −15 | | | | |
| | ... | | | | | | |
| | Advanced processing | 0.04 | −10 | | | | |

For a certain page pixel average value a, the background pixels may have multiple background descending levels, so that $p_2$ and $q_2$ can be combinations of a plurality of different values. Table 3 shows the exemplary values for $p_2$ and $q_2$ when the page pixel average value is 195. The present disclosure is not limited by this table. Any suitable preset parameter table may be used and encompassed within the scope of the present disclosure.

TABLE 3

| a | m | n | Background descending level | $p_1$ | $q_1$ | $p_2$ | $q_2$ |
|---|---|---|---|---|---|---|---|
| 195 | 0.04 | −10 | Slight background descending (Level 1) | 1 | 0 | −0.01 | 255 |
| ... | | | Moderate background descending (Level 3) | | | 0 | 254 |
| ... | | | Advanced background descending (Level 5) | | | 0 | 255 |

For a certain page pixel average value a, the foreground pixels can have multiple foreground adjusting levels, so that $p_1$ and $q_1$ can be combinations of a plurality of different values. Table 4 shows the exemplary values for $p_1$ and $q_1$ when the page pixel average value is 195. The present disclosure is not limited by this table. Any suitable preset parameter table may be used and encompassed within the scope of the present disclosure.

TABLE 4

| a | m | n | Foreground adjusting level | $p_1$ | $q_1$ | $p_2$ | $q_2$ |
|---|---|---|---|---|---|---|---|
| 195 | 0.04 | −10 | Conserve the foreground (Level 1) | 1 | 0 | 0 | 255 |
| ... | | | Slight foreground adjusting (Level 2) | 1 | −1 | | |
| ... | | | Advanced foreground adjusting (Level 3) | 0.99 | 10 | | |

The pixel processing degree, the background descending level, and/or the foreground adjusting level can be independently used or be combined randomly. The values of parameter m, n, $p_1$, $q_1$, $p_2$, and $q_2$, used independently or combined, are preset by the apparatus in a parameter table. When implementing, users only need to choose the pixel processing degree, the background descending level, and/or the foreground adjusting level. Of course in actual implementing, the user may not need to choose and instead directly use the default value of the apparatus $p_1=1$, $q_1=0$, $p_2=0$, and $q_2=255$, and the default value of m and n are the optimal values preset by the apparatus based on the value of a. The default values of the apparatus can also be a combination of the above parameter of certain values self-defined by the user.

The calculator 23 is connected with the image acquisition device 21 and the parameter acquisition device 22. The calculator 23 is used for calculating the page pixel average value a, a neighborhood pixel average value b, and a pixel processing threshold t(x,y). The page pixel average value a has been described above, and the calculating formula for the page pixel average value a is:

$$a = \Sigma g(x,y)/k$$

Here, g(x,y) is the original pixel value of a certain pixel point of the current page before adjustment, and k is the total number of pixel points of the current page data. The range of x and y, and the value of k are related to the scanning resolution and the size of the original image. If the scanning resolution is 300×300 and the size of the original image is 1 inch×2 inch, the range of x is [1, 300], the range of y is [1, 600], and k=180000. If the scanning resolution is 300×600 and the size of the original image is 2 inch×3 inch, the range of x is [1, 600], the range of y is [1, 1800], and k=1080000. The number b is the neighborhood pixel average value of the current pixel point g(x,y). Here, the number i is the coordinate of the current pixel point in the x direction of the rectangular coordinate system, and the number j is the coordinate of the current pixel point in the y direction of the rectangular coordinate system. In other words, a plurality of pixel points around the certain pixel point are extracted, and the average value of pixel values of the pixel points is calculated. Table 5 shows the neighborhood pixel point extraction exemplary method.

TABLE 5

| $g(i_1-1, j_1-1)$ | $g(i_1-1, j_1)$ | $g(i_1-1, j_1+1)$ |
| $g(i_1, j_1-1)$ | $g(i_1, j_1)$ | $g(i_1, j_1+1)$ |
| $g(i_1+1, j_1-1)$ | $g(i_1+1, j_1)$ | $g(i_1+1, j_1+1)$ |

The calculation formula for the neighborhood pixel average value b of the pixel point $g(i_1, j_1)$ is:

$$b_{i_1,j_1} = [g(i_1-1,j_1-1)+g(i_1-1,j_1)+g(i_1-1,j_1+1)+g(i_1,j_1-1)+g(i_1,j_1)+g(i_1,j_1+1)+g(i_1+1,j_1-1)+g(i_1+1,j_1)+g(i_1+1,j_1+1)]/9$$

Table 6 shows the neighborhood pixel extraction exemplary method

TABLE 6

| $g(i_2, j_2)$ | $g(i_2, j_2+1)$ |
| $g(i_2+1, j_2)$ | $g(i_2+1, j_2+1)$ |

The calculation formula for the neighborhood pixel average value b of the pixel point $g(i_2, j_2)$ is:

$$b_{i_2,j_2} = [g(i_2,j_2)+g(i_2,j_2+1)+g(i_2+1,j_2)+g(i_2+1,j_2+1)]/4$$

In the calculation process of the neighborhood pixel average value b, the above two extraction methods of neighborhood pixel points and the calculation are described for exemplary purpose only. The neighborhood pixel point extraction method and calculation are not limited by the disclosure.

The calculation method of the pixel processing threshold is:

$$t(x,y) = |a \times m - b|$$

Here, the number a is the page pixel average value, the number b is the neighborhood pixel average value, and m is the magnification of the page pixel average value. When $a \times m - b \geq 0$, $t(x,y) = a \times m - b$. When $a \times m - b < 0$, $t(x,y) = b - a \times m$.

The pixel processor 24 is connected to the calculator 23 and is used for adjusting the pixel values based on the pixel processing threshold.

Based on the calculation result obtained from the calculator 23, the pixel processor 24 is configured to adjust the pixel values of each pixel points corresponding to the current page data based on the comparing result between t(x,y) and (a+n). The detail adjusting method is:

$$G(x, y) = \begin{cases} \left(\frac{g(x, y)}{r}\right)^{p_1} \times r + q_1, t(x, y) \geq a+n \\ p_2 \times g(x, y) + q_2, t(x, y) < a+n \end{cases}$$

$$\text{or } G(x, y) = \begin{cases} p_1 \times g(x, y) + q_1, t(x, y) \geq a+n \\ p_2 \times g(x, y) + q_2, t(x, y) < a+n \end{cases}$$

Here, r is a fixed parameter preset by the apparatus and in a range of [1, 255], and for example, r=255. G(x,y) is the adjusted pixel value of the current pixel point and G(x,y) is the original pixel value of the current pixel point before adjustment. One of the two adjusting methods will be selected by the apparatus according to the preset setting.

When $t(x,y) \geq a+n$, the current pixel point g(x,y) is determined to be a foreground pixel, and the adjusting parameters of the foreground output pixel $p_1$ and $q_1$ may be applied to calculate. When $t(x,y) < a+n$, the current pixel point g(x,y) is determined to be a background pixel, and adjusting parameters of the background output pixels $p_2$ and $q_2$ may be applied to calculate.

It should be noted that, in the above adjusting method, when the calculation result of G(x,y) is less than zero, G(x,y) equals 0; and when the calculation result of G(x,y) is larger than 255, G(x,y) equals 255.

When the user does not select the background descending level and the foreground adjusting level in the process, the default value of the apparatus $p_1=1$, $q_1=0$, $p_2=0$, and $q_2=255$ may be used. The above adjusting method is:

$$G(x, y) = \begin{cases} g(x, y), t(x, y) \geq a+n \\ 255, t(x, y) < a+n \end{cases}$$

That is, the foreground pixels are reserved, and the background pixels are removed (the background is adjusted to be pure white).

In FIG. 2, the image processing apparatus according to some embodiments of the present disclosure may further include a display 25. The display 25 is connected with the pixel processor 24 and is used for displaying the preview image after the pixel values of the image data are adjusted based on the pixel processing threshold by using at least another portion of the image processing parameters.

In FIG. 2, the image processing apparatus according to some embodiments of the present disclosure further includes a receiver 26. The receiver 26 is connected with the parameter acquisition device 22, and is used for receiving the user's input of the pixel processing degree, the background descending level, and/or the foreground adjusting level before the parameter acquisition device 22 acquires the image processing parameters based on the page pixel average value. In this regard, the parameter acquisition device 22 is used for acquiring the image processing parameters according to the pixel processing degree, the background descending level, and/or the foreground adjusting level received from receiver 26 and based on the page pixel average value After the display 25 displays the adjusted preview image, the receiver 26 is further used for receiving a confirmation or a denial of the pixel processing degree, the background descending level, and/or the foreground adjusting level, so that it is convenient for the user to confirm the previous selected or to select again the value of the pixel processing degree, the background descending level, and/or the foreground adjusting level. After the receiver 26 receives from the user a denial of the pixel processing degree, the background descending level, and/or the foreground adjusting level, the pixel processing degree, the background descending level, and/or the foreground adjusting level will be received again from the input of the user. The pixel processor 24 is also connected with the receiver 26, and is used for outputting the adjusted image after the receiver 26 receives from the user a confirmation of the pixel processing degree, the background descending level, and/or the foreground adjusting level.

Figure 3:
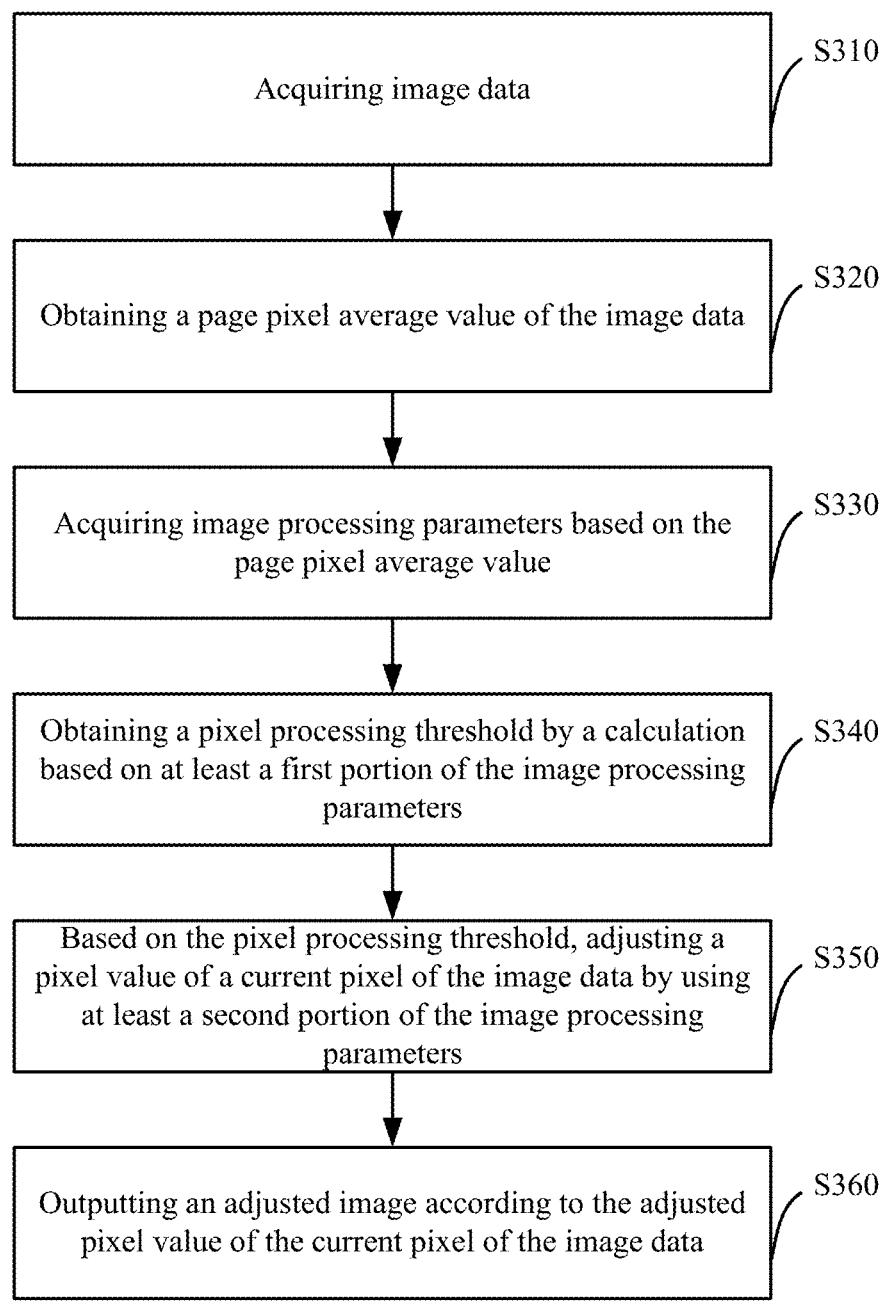
FIG. 3 is a flow diagram of an image processing method according to some embodiments of the present disclosure.

FIG. 3 illustrates a flowchart of an image processing method according to some embodiments of the present disclosure. As shown in FIG. 3, the image processing method may include the following.

In S310: acquiring the image data.

After the imaging device receives a command from the user, the image acquisition device performs a scanning operation by scanning the original draft on the draft table and generating an electronic image of the original draft. Alternatively, the image data may be acquired by shooting an electronic picture with the electronic device. Alternatively, image data may be acquired from an existing electronic picture in electronic devices, such as mobile phones, computers, etc.

It should be noted that, in the technical solution of the present disclosure, the method of obtaining the image data is not limited to the above-described method.

In S320: calculating and obtaining the page pixel average value of the image data.

After the image data are acquired, the calculator calculates the page pixel average value corresponding to the current page data of the image data.

In S330: acquiring the image processing parameters based on the page pixel average value.

The parameter acquisition device acquires the image processing parameters, which at least include a magnification m of the page pixel average value and an offset n of the page pixel average value, adjusting parameters $p_1$, $q_1$ of the foreground output pixel, and adjusting parameters $p_2$, $q_2$ of the background output pixel, by searching in the preset parameter table.

In S340: calculating the pixel processing threshold by using at least a portion of the image processing parameters.

The calculator firstly calculates the neighborhood pixel average value of the current pixel point in the image data, and then calculates and obtains the pixel processing threshold of the current pixel according to the page pixel average value calculated in S320, a magnification of the page pixel average value acquired in the S330, and the neighborhood pixel average value acquired in S330.

In S350: based on the pixel processing threshold, adjusting the pixel values of the image data by using at least another portion of the image processing parameters.

The pixel processor, based on the quantity relationship between the pixel processing threshold calculated in S340 and the sum of the page pixel average value and the offset of the page pixel average value, the pixel value of the current pixel is adjusted by using the adjusting parameters of the foreground output pixel and the adjusting parameters of the background output pixel acquired in S330.

In S360: outputting the adjusted image.

After the pixel value of each pixel point of the current page image data is processed with S340 and S350 or each page image data of a multi-page data is processed with S320-S350, the processed page/multi-page image data is stored as an electronic picture, stored as an electronic image (a scanned copy), output by printing (a copy), transmitted to a fax machine on a recipient side in a facsimile manner (a fax copy), or output in other reasonable modes.

Figure 4:
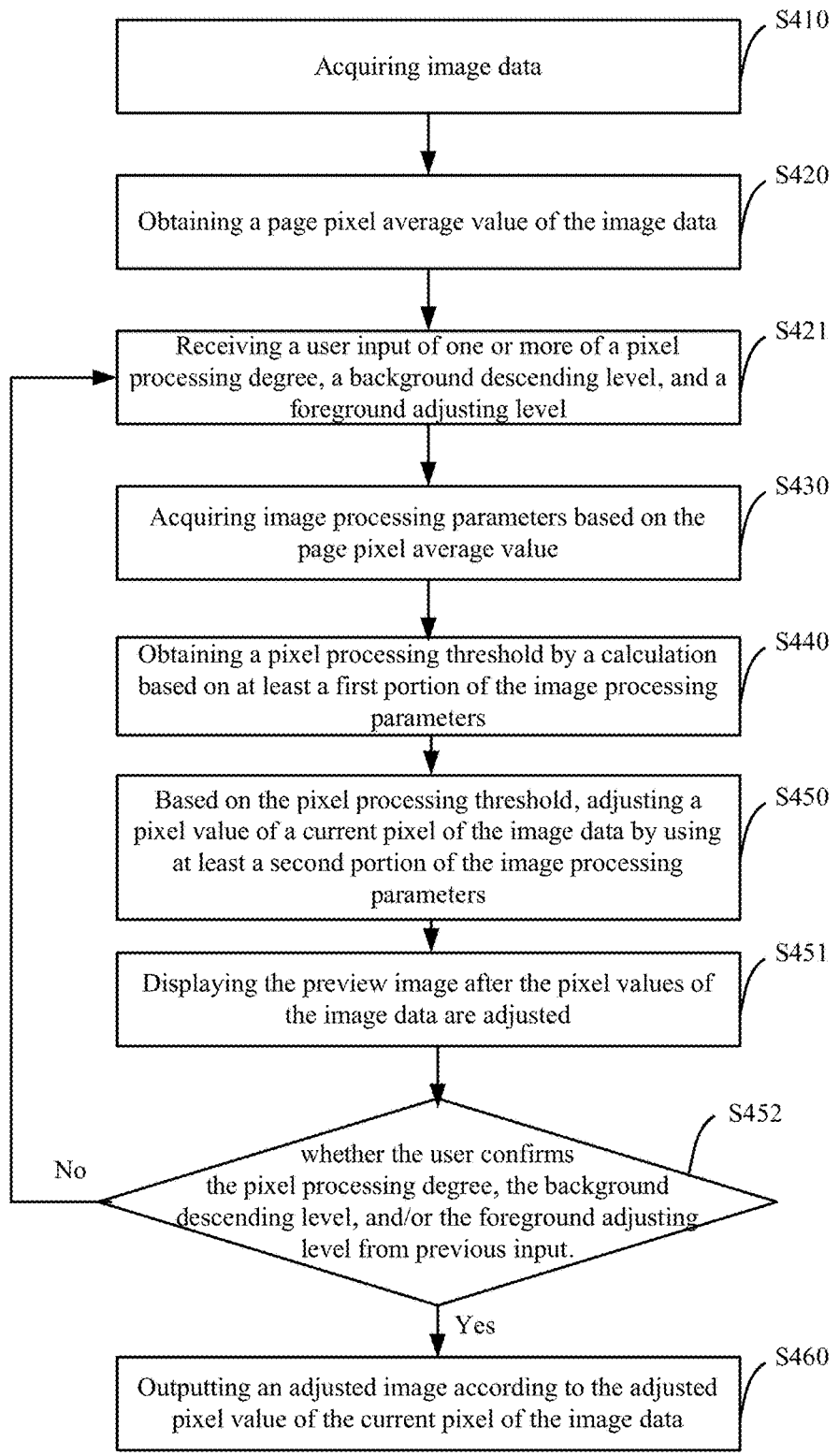
FIG. 4 is a flow diagram of an image processing method according to some embodiments of the present disclosure.

FIG. 4 illustrates a flow diagram of an image processing method according to some embodiments of the present disclosure. In the embodiments shown in FIG. 4, after obtaining the page pixel average value of the image data, the pixel processing degree, the background descending level, and/or the foreground adjusting level are received from the input of a user. Then, the image processing parameters are acquired according to the pixel processing degree, the background descending level, and/or the foreground adjusting level received from the input of the user and based on the page pixel average value. The preview image is formed for the user correspondingly, and the user checks the adjusting effect. If the user considers the adjusting effect meets the expectation, the adjusted image may be output. If the user considers the adjusting effect does not meet the expectation, the pixel processing degree, the background descending level, and/or the foreground adjusting level are received again from the selection and input of user. Then, the image is adjusted again based on the parameters reentered by the user until the adjusting effect meets the expectation of the user.

The embodiments as shown in FIG. 4 also have the content in the embodiments as shown in FIG. 3, and the major content of S410-S460 as shown in FIG. 4 and the major content of S310 and the S360 of the embodiments as shown in FIG. 3 are the same, respectively. As shown in FIG. 4, the embodiments further include the following in addition to the embodiments shown in FIG. 3.

In S421: before S430, e.g., before acquiring the image processing parameters based on the page pixel average value, receiving the pixel processing degree, the background descending level, and/or the foreground adjusting level from the input of the user.

The user, through an imaging equipment panel, an imaging equipment webpage, an interface of a computer scanning driver, an interface of the mobile terminal application program, etc. (including but not limited to the above method), selects and confirms that the pixel processing degree, the background descending level, and/or the foreground adjusting level are what the user wanted, and receives the pixel processing degree, the background descending level, and/or the foreground adjusting level from the input of the user Accordingly, the parameter acquisition device is used for acquiring the image processing parameters according to the pixel processing degree, the background descending level, and/or the foreground adjusting level received from the input of the user and on the basis of the page pixel average value.

In S451: after S450, e.g., after adjusting the pixel values of the image data by using at least another portion of the image processing parameters based on the pixel processing threshold, displaying the preview image after the pixel values of the image data are adjusted In S452: after the preview image is displayed, awaiting an operation of a confirmation or a denial of the pixel processing degree, the background descending level, and/or the foreground adjusting level from the input of the user in S421 and determining whether the user confirms the pixel processing degree, the background descending level, and/or the foreground adjusting level from previous input. If a confirmation of the pixel processing degree, the background descending level, and/or the foreground adjusting level is received from the user in S421, for example, the apparatus receives commands such as 'Satisfied", "Confirmation", or "Yes" from the user, it will receive the pixel processing degree, the background descending level, and/or the foreground adjusting level from the user. It also shows the users accepts the results of the image adjustment based on the input parameters of the pixel processing degree, the background descending level, and/or the foreground adjusting level, and the adjusted image may be output (S460). If a denial of the pixel processing degree, the background descending level, and/or the foreground adjusting level is received from the user in S421, for example, the apparatus receives commands such as 'Not satisfied", "Reselect", or "No" from the user, S421 will be performed and the pixel processing degree, the background descending level, and/or the foreground adjusting level will be received again from the selection and the input of the user.

After the pixel values of all pixel points of the image data of the current page are adjusted, the adjusted image by using the parameters of the background descending level and the foreground adjusting level acquired by searching the table to adjust the pixel values of the image data of the current page is displayed on the imaging equipment panel, the imaging equipment webpage, the interface of a computer scanning driver, the interface of the mobile terminal application program, etc. (including but not limited to the above method). The user decides whether to use the selected the pixel processing degree, the background descending level, and/or the foreground adjusting level.

When the user selects "No", the user is sent back for selecting the pixel processing degree, the background descending level, and/or the foreground adjusting level, e.g., the user is returned to S421 to receive again the pixel processing degree, the background descending level, and/or the foreground adjusting level from the selection of the user. When the user selects "Yes", the adjusted image may be output.

It should be noted that, although in some embodiments, before S451 is performed, S421, etc., are performed, but performing the S451 in the technical scheme of the present disclosure, e.g., displaying the preview image after the pixel values of the image data are adjusted, does not depend on the existence of the S421. In other words, in other embodiments of the present disclosure, even without the input process of the pixel processing degree, the background descending level, and/or the foreground adjusting level, displaying the preview image after the pixel values of the image data of current page are adjusted may still be performed.

It is noted that since the computing device generally has a strong processing capability, the calculator, the pixel processor, etc., can have very fast processing speed. Thus, after the user selects the pixel processing degree, the background descending level, and/or the foreground adjusting level, the preview image can be displayed in a very short time. Therefore, it is guaranteed that the processing processes can display the preview image in real time after the user selects or changes the pixel processing degree, the background descending level, and/or the foreground adjusting level.

Figure 5:
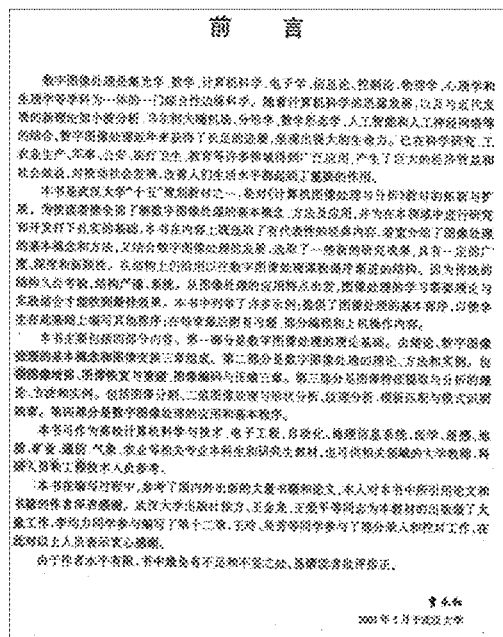
FIG. 5 is a schematic effect diagram of an electronic image after using an image processing method on the electronic image as shown in FIG. 1B to adjust pixels according to some embodiments of the present disclosure.

FIG. 5 shows the image 501 after performing the image processing method on the image 101 of FIG. 1B according to some embodiments of the present disclosure. By comparing 101 and 501, it can be intuitively sensed that by using the image processing method in the present disclosure the background data in the electronic picture or the scanned image can be well removed, or the background data can be well adjusted. According to some embodiments of the disclosure, the foreground data can be improved according to user requirements, so that the visual effect of the foreground data is enhanced. According to some embodiments of the disclosure, different degrees of processing can be performed on the page data pixels according to the user selection, so that users with different requirements can be satisfied. Therefore, the electronic image defect in the electronic picture or the electronic image obtained by scanning can be corrected, and the quality of the output piece can be greatly improved.

The technical problem to be solved by the present invention is to overcome the defects. For example, the electronic picture captured by the electronic device in the prior art or the electronic image scanned by the scanner contains background data or foreground data, which does not meet the user's expectation.

Compared with the prior art, the present invention can effectively remove background data and/or significantly improve foreground data of an electronic picture or a scanned image to improve the image quality of an output piece.

According to the image processing method in the present disclosure, loop iterations are not needed, and the operation time of the apparatus is short. The disadvantage that the common image processing methods need loop iterations and the operation time of the apparatus is long can be overcome. In addition, while the present invention may realize short operation time of the apparatus and the removal of the background data, the present invention can also adjust the visual effects of the foreground data according to the user requirements. Without adjusting the foreground data, the defect that content could be lost when the foreground data is adjusted while removing the background data in the common image processing methods of prior art can be overcome.

It should be understood by those skilled in the art, all the components of the apparatus and the means in the method provided by the embodiments of the disclosure can be concentrated on a single computing device or distributed on a network formed by a plurality of computing devices. For example, the method can be implemented by a program code executable by a computing device. Thus, the program code can be stored in a storage device and be executed by a computing device. Alternatively, the components of the apparatus can be respectively manufactured to form various integrated circuit modules. Alternatively, a plurality of the modules or means can be manufactured to form a single integrated circuit module. The invention is not limited to combinations of any specific hardware and software.

It should also be noted that the above embodiments are only used to illustrate the technical solutions of the present invention and are not limited thereto. It should be understood by those of ordinary skill in the art that forms and details of the implementation can still be modified and replacement, and the modification or replacement does not make the essence of the corresponding technical solution deviate from the scope of the technical solutions of the embodiments of the present invention. The protection scope of the invention should be accorded the broadest interpretation of the appended claims.

What is claimed is:

1. An image processing method, comprising:
acquiring image data;
obtaining a page pixel average value of the image data;
acquiring image processing parameters based on the page pixel average value, wherein the image processing parameters comprise:
 a magnification of the page pixel average value;
 an offset of the page pixel average value;
 adjusting parameters of a foreground output pixel; and
 adjusting parameters of a background output pixel;
obtaining a pixel processing threshold by a calculation based on at least a first portion of the image processing parameters, comprising:
 obtaining a neighborhood pixel average value of the current pixel of the image data; and
 obtaining the pixel processing threshold of the current pixel according to the page pixel average value, the magnification of the page pixel average value, and the neighborhood pixel average value;
based on the pixel processing threshold, adjusting a pixel value of a current pixel of the image data by using at least a second portion of the image processing parameters; and
outputting an adjusted image according to the adjusted pixel value of the current pixel of the image data.

2. The image processing method according to claim 1, wherein based on the pixel processing threshold, adjusting the pixel value of the current pixel of the image data by using at least the second portion of the image processing parameters comprises:
based on a quantity relationship between the pixel processing threshold and a sum of the page pixel average value and the offset of the page pixel average value, adjusting the pixel value of the current pixel using the adjusting parameters of the foreground output pixel and the adjusting parameters of the background output pixel.

3. The image processing method according to claim 1, further comprising:
after adjusting the pixel value of the current pixel of the image data using at least the second portion of the image processing parameters and based on the pixel processing threshold, displaying an adjusted preview image.

4. The image processing method according to claim 3, further comprising:
before acquiring the image processing parameters based on the page pixel average value, receiving a user input of one or more of a pixel processing degree, a background descending level, and a foreground adjusting level,
wherein acquiring the image processing parameters is based on the one or more of the pixel processing degree, the background descending level, and the foreground adjusting level, and also based on the page pixel average value.

5. The image processing method according to claim 4, further comprising:
before outputting the adjusted image, receiving a confirmation or denial, from a user, of the one or more of the pixel processing degree, the background descending level, and the foreground adjusting level,
in response to receiving a denial, from the user, of the one or more of the pixel processing degree, the background descending level, and the foreground adjusting level, re-receiving the pixel processing degree, the background descending level, and the foreground adjusting level from the user input, and
in response to receiving the confirmation from the user of the one or more of the pixel processing degree, the background descending level, and the foreground adjusting level, outputting the adjusted image according to the adjusted pixel value of the current pixel of the image data.

6. An image processing apparatus, comprising:
an image acquisition device, configured to acquire image data;
a parameter acquisition device, configured to acquire image processing parameters based on a page pixel average value, wherein the image processing parameters comprise:
  a magnification of the page pixel average value;
  an offset of the page pixel average value;
  adjusting parameters of a foreground output pixel; and
  adjusting parameters of a background output pixel;
a calculator, configured to obtain the page pixel average value of the image data and obtain a pixel processing threshold by a calculation based on at least a first portion of the image processing parameters, wherein the calculator is further configured to:
  obtain a neighborhood pixel average value of the current pixel of the image data; and
  obtain the pixel processing threshold of the current pixel according to the page pixel average value, the magnification of the page pixel average value, and the neighborhood pixel average value; and
a pixel processor, configured to, based on the pixel processing threshold, adjust a pixel value of a current pixel of the image data by using at least a second portion of the image processing parameters and output an adjusted image according to the adjusted pixel value of the current pixel of the image data.

7. The image processing apparatus according to claim 6, wherein the pixel processor is further configured to:
based on a quantity relationship between the pixel processing threshold and a sum of the page pixel average value and the offset of the page pixel average value, adjust the pixel value of the current pixel using the adjusting parameters of the foreground output pixel and the adjusting parameters of the background output pixel; and
output the adjusted image according to the adjusted pixel value of the current pixel of the image data.

8. The image processing apparatus according to claim 6, further comprising:
  a display, configured to display an adjusted preview image, after the pixel processor, based on the pixel processing threshold, adjusts the pixel value of the current pixel of the image data using at least the second portion of the image processing parameters.

9. The image processing apparatus according to claim 8, further comprising:
  a receiver, configured to, before acquiring the image processing parameters based on the page pixel average value, receive a user input of one or more of a pixel processing degree, a background descending level, and a foreground adjusting level,
  wherein the parameter acquisition device is further configured to acquire the image processing parameters based on the one or more of the pixel processing degree, the background descending level, and the foreground adjusting level, and also based on the page pixel average value.

10. The image processing apparatus according to claim 9, wherein:
  the receiver is further configured to, before outputting the adjusted image, receive a confirmation or denial, from a user, of the one or more of the pixel processing degree, the background descending level, and the foreground adjusting level,
  in response to receiving a denial, from the user, of the one or more of the pixel processing degree, the background descending level, and the foreground adjusting level, the receiver is further configured to re-receive the pixel processing degree, the background descending level, and the foreground adjusting level from the user input, and
  in response to receiving the confirmation, from the user, of the one or more of the pixel processing degree, the background descending level, and the foreground adjusting level, the pixel processor is further configured to output an adjusted image according to the adjusted pixel value of the current pixel of the image data.

\* \* \* \* \*